(12) United States Patent
Esbelin et al.

(10) Patent No.: US 9,926,447 B2
(45) Date of Patent: *Mar. 27, 2018

(54) CURABLE POLYISOCYANATE COMPOSITION COMPRISING AN EPOXY

(71) Applicant: Huntsman International LLC, The Woodlands, TX (US)

(72) Inventors: Christian Esbelin, Schaerbeek (BE); Hans Godelieve Guido Verbeke, Lubbeek (BE); Hugo Verbeke, Leuven (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 76 days.

This patent is subject to a terminal disclaimer.

(21) Appl. No.: 14/355,856

(22) PCT Filed: Nov. 7, 2012

(86) PCT No.: PCT/EP2012/071968
§ 371 (c)(1),
(2) Date: May 2, 2014

(87) PCT Pub. No.: WO2013/075938
PCT Pub. Date: May 30, 2013

(65) Prior Publication Data
US 2015/0065611 A1    Mar. 5, 2015

(30) Foreign Application Priority Data

Nov. 22, 2011 (EP) ..................... 11190085

(51) Int. Cl.
| | | |
|---|---|---|
| *C08L 75/04* | (2006.01) | |
| *C08L 63/00* | (2006.01) | |
| *C08G 59/06* | (2006.01) | |
| *C08G 59/40* | (2006.01) | |
| *C08G 59/44* | (2006.01) | |

(52) U.S. Cl.
CPC ............ *C08L 75/04* (2013.01); *C08G 59/066* (2013.01); *C08G 59/4021* (2013.01); *C08G 59/44* (2013.01); *C08L 63/00* (2013.01)

(58) Field of Classification Search
CPC ....................................................... C08L 75/04
See application file for complete search history.

(56) References Cited

U.S. PATENT DOCUMENTS

| | | | |
|---|---|---|---|
| 2,955,101 A | 10/1960 | Bruin et al. | |
| 3,294,749 A | 12/1966 | Pratt | |
| 3,517,039 A | 6/1970 | Wagner et al. | |
| 3,660,456 A * | 5/1972 | Naito et al. ............ | C07C 265/14 560/331 |
| 3,676,380 A * | 7/1972 | McLaughlin ........ | C08G 18/092 502/167 |
| 3,970,600 A | 6/1976 | Falkenstein et al. | |
| 4,009,063 A | 2/1977 | Wood | |
| 4,366,012 A | 12/1982 | Wood | |
| 4,507,447 A * | 3/1985 | Yamazaki .......... | C08G 18/3882 525/111 |
| 4,622,196 A | 11/1986 | Wood | |
| 4,658,007 A | 4/1987 | Marks et al. | |
| 5,086,150 A | 2/1992 | Frauendorf et al. | |
| 5,326,833 A | 7/1994 | Parodi et al. | |
| 2010/0022707 A1 | 1/2010 | Schaefer et al. | |
| 2010/0273005 A1 | 10/2010 | Kramer et al. | |

FOREIGN PATENT DOCUMENTS

| | | | |
|---|---|---|---|
| EP | 0 585 835 | 8/1993 | |
| GB | 1087874 A * | 10/1967 | ............ C08G 59/44 |
| JP | 58145721 A * | 8/1983 | |
| JP | 02-110123 | 4/1990 | |
| WO | 2007/096216 | 8/2007 | |
| WO | 2008/068198 | 6/2008 | |
| WO | 2010/121898 | 10/2010 | |
| WO | WO 2010121898 A1 * | 10/2010 | ........... C08G 18/003 |

OTHER PUBLICATIONS

Sheth, Jignesh P. et al.. Polymer 45, pp. 5979-5984 (2004).
Pankratov, V.A. et al., Russian Chemical Reviews, 52 (6), pp. 576-593 (1983).
Yang, Juan et al., Journal of East China University of Science and Technology, vol. 32 No. 11, pp. 1293-1296 (2006).
Woods, The ICI Polyurethanes Book, 2nd edition, pp. 32-35 (1990).

* cited by examiner

*Primary Examiner* — Randy P Gulakowski
*Assistant Examiner* — Ha S Nguyen
(74) *Attorney, Agent, or Firm* — Huntsman International LLC; Robert Diaz

(57) ABSTRACT

Curable composition obtained by combining and mixing an epoxy resin composition, comprising an epoxy resin and a carboxamide, and a polyisocyanate composition, comprising a polyisocyanate, a lithium halide and a urea compound, wherein the number of moles of lithium halide per isocyanate equivalent ranges of from 0.0001-0.04 and the number of urea+biuret equivalents per isocyanate equivalent of from 0.0001-0.4.

19 Claims, No Drawings

CURABLE POLYISOCYANATE COMPOSITION COMPRISING AN EPOXY

This application is the National Phase of International Application PCT/EP2012/071968 filed Nov. 7, 2012 which designated the U.S. and which claims priority to Foreign Application No. 11190085.8 filed Nov. 22, 2011. The noted applications are incorporated herein by reference.

The present invention is related to an epoxy resin composition and a curable composition made by combining said epoxy resin composition with a polyisocyanate composition. Further the present invention is related to a process for preparing said epoxy resin composition and said curable composition. Still further the present invention is concerned with a process to prepare a polyisocyanurate comprising material by allowing the curable composition to react and to a polyisocyanurate comprising material made by allowing such curable composition to react.

Recently a curable composition has been proposed which comprises a polyisocyanate, a lithium halide, a urea compound and an epoxy resin; see WO 2010/121898. Surprisingly we have found that the pot-life of a curable polyisocyanate composition could be further improved by using an epoxy resin composition which comprises a compound which comprises a carboxamide group, without negatively influencing the curing of the curable composition.

Therefore the present invention relates to an epoxy resin composition comprising an epoxy resin, a compound which comprises a carboxamide group having the structure —CO—NH$_2$, and optionally a solvent which has no isocyanate-reactive groups, and optionally a monool and/or a polyol wherein the number of carboxamide equivalents per epoxy equivalent is 0.0005-1 and preferably 0.005-0.7 and most preferably 0.01-0.5 and the number of hydroxy equivalents per epoxy equivalent is at most 0.019 and preferably at most 0.014 and most preferably at most 0.010.

According to an embodiment the epoxy resin composition according to the invention is suitable for making a curable composition and comprises an epoxy resin, a compound which comprises a carboxamide group having the structure —CO—NH$_2$, a solvent which has no isocyanate-reactive groups, and optionally a monool and/or a polyol wherein the number of carboxamide equivalents per epoxy equivalent is 0.0005-1 and preferably 0.005-0.7 and most preferably 0.01-0.5 and the number of hydroxy equivalents per epoxy equivalent is at most 0.019 and preferably at most 0.014 and most preferably at most 0.010.

Further the present invention relates to a process to prepare such an epoxy resin composition wherein a mixture of the compound comprising the carboxamide group is combined and mixed with the epoxy resin. The relative amounts of the ingredients are chosen such that the epoxy resin composition comprises the ingredients in the above given amounts.

Still further the present invention relates to a curable composition obtained by combining and mixing a polyisocyanate composition, comprising a polyisocyanate, a lithium halide and a urea compound, having an average molecular weight of 500-15000 and optionally comprising biuret groups, and an epoxy resin composition, as defined above, wherein the number of moles of lithium halide per isocyanate equivalent ranges from 0.0001-0.04, the number of urea+biuret equivalents per isocyanate equivalent ranges from 0.0001-0.4 and the number of epoxy equivalents per isocyanate equivalent ranges from 0.003-1.

The curable composition according to the invention is preferably obtained by combining and mixing a polyisocyanate composition, comprising a polyisocyanate, a lithium halide and a urea compound, having an average molecular weight of 500-15000 and optionally comprising biuret groups wherein the number of moles of lithium halide per isocyanate equivalent ranges of from 0.0001-0.04 and the number of urea+biuret equivalents per isocyanate equivalent ranges of from 0.0001-0.4 and the number of epoxy equivalents per isocyanate equivalent ranges of from 0.003-1, and an epoxy resin composition comprising an epoxy resin, a compound which comprises a carboxamide group having the structure —CO—NH$_2$ and a solvent which has no isocyanate-reactive groups, wherein the number of carboxamide equivalents per epoxy equivalent is 0.0005-1 and preferably 0.005-0.7 and most preferably 0.01-0.5

According to an embodiment, the curable composition is made using an epoxy resin composition which comprises a compound which comprises a carboxamide group having the structure —CO—NH$_2$ which corresponds to the structure NH$_2$—CO—R wherein R is 1) hydrogen (—H), 2) —NR$_1$R$_2$, 3) hydrocarbyl having 1-20 carbon atoms and optionally comprising hydroxy, ether, halogen and/or amine groups, or 4) —R$_3$—CO—NH$_2$, wherein R$_1$ and R$_2$, independently from each other, are selected from hydrogen, hydroxy, halogen and hydrocarbyl groups which hydrocarbyl groups have 1-10 carbon atoms and optionally comprise hydroxy, ether, halogen and/or amine groups and wherein R$_3$ is a bivalent hydrocarbon radical having up to 8 carbon atoms and mixtures of such compounds and wherein the number of carboxamide equivalents per epoxy equivalent is 0.01-0.5.

According to an embodiment, the curable composition is made using an epoxy resin composition which comprises a compound which comprises a carboxamide group having the structure —CO—NH$_2$ which corresponds to the structure NH$_2$—CO—R wherein R is 1) —NR$_1$R$_2$, 2) alkyl having 1-10 carbon atoms and optionally comprising 1-3 hydroxy and/or ether groups, 3) phenyl or 4) tolyl, wherein R$_1$ and R$_2$, independently from each other, are selected from hydrogen, hydroxy, phenyl, tolyl and alkyl having 1-6 carbon atoms and optionally comprising an hydroxy and/or an ether group and mixtures of such compounds.

According to an embodiment, the epoxy resin composition used to make the curable composition according to the invention may further comprise a monool and/or a polyol wherein the number of hydroxy equivalents per epoxy equivalent is at most 0.019 and preferably at most 0.014 and most preferably at most 0.010

Still further the present invention is concerned with a process to prepare a polyisocyanurate comprising material by allowing the above defined curable composition to react at elevated temperature and with the polyisocyanurate material prepared in this way.

The use of lithium chloride and compounds comprising urea groups has been disclosed by Sheth, Aneja and Wilkes in Polymer 45 (2004) 5979-5984. They studied the influence of the extent of hydrogen bonding in mediating the long-range connectivity and percolation of the hard segment phase in model tri-segment oligomeric polyurethanes using LiCl as a molecular probe.

In U.S. Pat. No. 5,086,150 an isocyanate-terminated prepolymer is reacted with a diamine in the presence of a rather high amount of LiCl to prepare an elastomer solution which is stable for at least two days. At the beginning of the reaction the number of moles of lithium chloride per isocyanate equivalent is rather high; the lithium chloride is used to act as a solubilizer. At the beginning of the reaction, the composition is not stable and does not contain urea and at the end of the reaction it is an elastomer and not an isocyanate composition anymore. The product obtained is an elastomer solution used for making threads and films.

The use of isocyanates and epoxides together with LiCl has been disclosed in Russian Chemical Reviews 52(6) 1983, 576-593. The reaction is influenced by the nature of the catalyst. In the presence of metal halides an activated complex is formed which ultimately gives an oxazolidone. One of the side reactions is the formation of isocyanurate rings which decompose to oxazolidone on treatment with epoxides. Further it has been disclosed therein that epoxides are capable of cleaving urea linkages with formation of oxazolidones.

U.S. Pat. No. 4,658,007 discloses a process for preparing oxazolidone containing polymer using organoantimony iodide catalyst by reacting a polyisocyanate and a polyepoxide. U.S. Pat. No. 5,326,833 discloses a composition comprising a polyisocyanate, an epoxide and a catalyst consisting of a solution of an alkali halide, like LiCl, in a polyoxyalkylenic compound. These compositions are able to gel rapidly between 0° C. and 70° C. Juan et al discuss in the Journal of East China University of Science and Technology Vol. 32, No 11, 2006, 1293-1294 the influence of LiCl on the morphology structure and properties of polyurethane-urea. It shows that the viscosity of polyurethane urea solutions first decreases and subsequently increases. The polyurethane urea was made by reacting polyepoxypropane glycol and isophorone diisocyanate with excess polyisocyanate.

In U.S. Pat. No. 3,517,039 acylated urea polyisocyanates are made by reacting an organic diisocyanate with an organic monocarboxylic acid. These polyisocyanates are used in the preparation of polyurethanes, especially when small amounts of branching are desirable.

In U.S. Pat. No. 3,970,600 stable solutions of isocyanurate-polyisocyanates containing amide and/or acylurea groups have been described. They avoid deposition of fine or coarse crystalline solids in polyisocyanates comprising isocyanurate groups. First a polyisocyanate is reacted with polybasic carboxylic acid to prepare a polyisocyanate with amide and/or—substituted—acylurea groups. Then this polyisocyanate is trimerized to form an isocyanurate-polyisocyanate and this conversion is stopped by adding acid.

In JP 2-110123 an aliphatic diisocyanate is trimerized to prepare polyisocyanates which have an isocyanurate structure using a catalyst and a deactivating agent once the desired degree of conversion has been attained. The deactivating agent has the structure —CO—$NH_2$ or —SO—$NH_2$ and may be urea, methyl urea, 1,1-dimethyl urea, phenyl carbamate, ethylcarbamate or butylcarbamate. Subsequently deactivated catalyst, excess diisocyanate and solvent, if used, are eliminated. By using this deactivating agent the polyisocyanate comprising polyisocyanurate structure shows a lower degree of discolouration.

WO 2008/068198 and US 2010/0022707 disclose a process for preparing an oligomerized polyisocyanate using a catalyst wherein a deactivator is used once the desired conversion has been obtained followed by removal of the polyisocyanate which was not converted. The deactivator may be selected from urea and urea containing compounds, amongst others.

EP 585835 discloses a process for preparing isocyanurate and urethane group containing polyisocyanate mixtures by partially cyclizing diisocyanates in the presence of a trimerization catalyst, deactivating the trimerization catalyst when the desired conversion is achieved, and subsequently reacting the resultant isocyanurate group containing polyisocyanate with hydroxyl compounds and then separating off the monomeric diisocyanate.

Epoxy compositions containing carboxamide compounds are described in U.S. Pat. No. 2,955,101, U.S. Pat. No. 3,294,749 and US 2010/273005 but not in combination with curable polyisocyanate comprising compositions.

In the context of the present invention the following terms have the following meaning:

1) isocyanate index or NCO index or index:
   the ratio of NCO-groups over isocyanate-reactive hydrogen atoms present in a formulation, given as a percentage:

$$\frac{[NCO] \times 100(\%)}{[\text{active hydrogen}]}.$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

5) The word "average" refers to number average unless indicated otherwise.

6) "Trimerization catalyst" as used herein refers to a catalyst being able to catalyse (promote) the formation of isocyanurate groups from polyisocyanates.

7) "Polyisocyanurate comprising material" refers to a polyisocyanate composition comprising more than 10% by weight polyisocyanurate, preferably at least 50% by weight polyisocyanurate, more preferably 75% by weight, calculated on the total weight of the material.

The epoxy resin used in the epoxy resin composition according to the present invention preferably is selected from any epoxy resin which is liquid at 20° C.

Examples of epoxy resins are:

I) Polyglycidyl and poly(β-methylglycidyl) esters, obtainable by reacting a compound having at least two carboxyl groups in the molecule and, respectively, epichlorohydrin and β-methylepichlorohydrin. The reaction is expediently effected in the presence of bases.

Aliphatic polycarboxylic acids can be used as the compound having at least two carboxyl groups in the molecule. Examples of such polycarboxylic acids are oxalic acid, succinic acid, glutaric acid, adipic acid, pimelic acid, suberic acid, azelaic acid and dimerized or trimerized linoleic acid.

However, cycloaliphatic polycarboxylic acids, such as, for example, tetrahydrophthalic acid, 4-methyltetrahydrophthalic acid, hexahydrophthalic acid or 4-methylhexahydrophthalic acid, may also be used.

Furthermore, aromatic polycarboxylic acids, such as, for example, phthalic acid, isophthalic acid or terephthalic acid, may be used.

II) Polyglycidyl or poly(β-methylglycidyl)ethers, obtainable by reacting a compound having at least two free alcoholic hydroxyl groups and/or phenolic hydroxyl groups with epichlorohydrin or β-methylepichlorohydrin under alkaline conditions or in the presence of an acidic catalyst with subsequent treatment with alkali.

The glycidyl ethers of this type are derived, for example, from acyclic alcohols, for example from ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol or sorbitol, and from polyepichlorohydrins. Further glycidyl ethers of this type are derived from cycloaliphatic alcohols, such as 1,4-cyclohexanedimethanol, bis(4-hydroxycyclohexyl)methane or 2,2-bis(4-hydroxycyclohexyl)propane, or from alcohols which contain aromatic groups and/or further functional groups, such as N,N-bis(2-hydroxyethyl)aniline or p,p'-bis(2-hydroxyethylamino)-diphenylmethane.

The glycidyl ethers may also be based on mononuclear phenols, such as, for example, p-tert-butylphenol, resorcinol or hydroquinone, or on polynuclear phenols, such as, for example, bis(4-hydroxyphenyl)methane, 4,4'-dihydroxybiphenyl, bis(4-hydroxyphenyl) sulphone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Further suitable hydroxy compounds for the preparation of glycidyl ethers are novolaks, obtainable by condensation of aldehydes, such as formaldehyde, acetaldehyde, chloral or furfuraldehyde, with phenols or bisphenols which are unsubstituted or substituted by chlorine atoms or $C_1$-$C_9$-alkyl groups, such as, for example, phenol, 4-chlorophenol, 2-methylphenol or 4-tert-butylphenol.

III) Poly(N-glycidyl) compounds, obtainable by dehydrochlorination of the reaction products of epichlorohydrin with amines which contain at least two amine hydrogen atoms. These amines are, for example, aniline, n-butylamine, bis(4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, which are derived from dithiols, such as, for example, ethane-1,2-dithiol or bis(4-mercaptomethylphenyl)ether.

V) Cycloaliphatic epoxy resins, such as, for example, bis(2,3-epoxycyclopentyl)ether, 2,3-epoxycyclopentyl glycidyl ether, 1,2-bis(2,3-epoxycyclopentyloxy)ethane or 3,4-epoxycyclohexylmethyl-3',4'-epoxycyclohexanecarboxylate.

It is also possible to use epoxy resins in which the 1,2-epoxy groups are bonded to different hetero atoms or functional groups; these compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl) propane.

Particularly preferred are those mentioned in I and II and most preferred are those mentioned in II.

If an epoxy resin is used which contains hydroxyl groups or other isocyanate-reactive hydrogens then these hydroxyl groups and hydrogens are not taken into account in calculating the index or the number of hydroxyl equivalents.

The carboxamide preferably is selected from a compound according to the formula $NH_2$—CO—R wherein R is 1) hydrogen (—H), 2) —$NR_1R_2$, 3) hydrocarbyl having 1-20 carbon atoms and optionally comprising hydroxy, ether, halogen and/or amine groups, or 4) —$R_3$—CO—$NH_2$, wherein $R_1$ and $R_2$, independently from each other, are selected from hydrogen, hydroxy, halogen and hydrocarbyl groups which hydrocarbyl groups have 1-10 carbon atoms and optionally comprise hydroxy, ether, halogen and/or amine groups and wherein $R_3$ is a bivalent hydrocarbon radical having up to 8 carbon atoms. Mixtures of these carboxamides may be used as well. Preferably such carboxamides have a molecular weight of at most 499.

The hydrocarbyl groups in these carboxamides may be linear or branched, saturated or unsaturated and cyclic or non-cyclic; they may be aliphatic, aromatic or araliphatic.

More preferred carboxamides are those wherein R is 1) —$NR_1R_2$, 2) alkyl having 1-10 carbon atoms and optionally comprising 1-3 hydroxy and/or ether groups, 3) phenyl or 4) tolyl, wherein $R_1$ and $R_2$, independently from each other, are selected from hydrogen, hydroxy, phenyl, tolyl and alkyl having 1-6 carbon atoms and optionally comprising an hydroxy and/or an ether group. Mixtures of such more preferred compounds are also more preferred.

Examples of very useful carboxamides are the following ones.

| R | Name |
|---|---|
| —$NH_2$ | Urea |
| —NHOH | Hydroxyurea |
| —NH($CH_3$) | N-Methyl urea |
| —N($CH_3$)$_2$ | 1,1-dimethyl urea |
| —N($C_2H_5$)$_2$ | 1,1-diethyl urea |
| —NH—$C_6H_5$ | Phenylurea |
| —NH—$C_6H_4$—$CH_3$ | Tolylurea |
| —H | Formamide |
| —$CH_3$ | Ethanamide |
| —$C_2H_5$ | Propionamide |

| R | Name |
| --- | --- |
| —OC$_2$H$_5$ | Ethyl carbamate |
| —OC$_4$H$_9$ | Butyl carbamate |
| —OC$_6$H$_5$ | Phenyl carbamate |
| —OCH$_2$—CH$_2$OH | Hydroxyethyl carbamate |
| —OCH(CH$_3$)—CH$_2$OH | Hydroxypropyl carbamate |
| —CH(CH$_3$)—OH | Lactamide |
| —C$_6$H$_5$ | Benzamide |
| 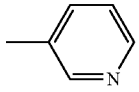 | Nicotinamide |

Most preferably urea is used. It is to be noted that in calculating the number of carboxamide equivalents urea is regarded as containing 2 carboxamide groups.

The monool and/or polyol optionally used in the epoxy resin composition according to the present invention preferably has an average nominal hydroxy functionality of 1-8 and an average molecular weight of 32-8000. Mixtures of monools and/or polyols may be used as well.

Examples of such monools are methanol, ethanol, propanol, butanol, phenol, cyclohexanol and hydrocarbon monools having an average molecular weight of 200-5000 like aliphatic and polyether monools. Examples of polyols are ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having more carbon atoms than these compounds and having a molecular weight of up to 8000, polyester polyols having an average molecular weight of 200-8000, polyether polyester polyols having an average molecular weight of 200-8000 and polyether polyols having an average molecular weight of 200-8000. Such monools and polyols are commercially available. Useful examples are Daltocel® F526, Daltocel® F555 and Daltocel® F442, which are all polyether triols from Huntsman, Voranol® P400 and Alcupol® R1610, which are polyether polyols from DOW and Repsol, respectively, and Priplast® 1838 and 3196 which are high molecular weight polyester polyols from Croda having a molecular weight of 2000 and 3000 respectively, and Capa® 2043 polyol, a linear polyesterdiol of average molecular weight of about 400 from Perstorp, and K-Flex® polyols 188 and A308 which are polyester polyols from King Industries having a molecular weight of about 500 and 430 respectively, and aromatic polyester polyols like Stepanpol® PH56 and BC180 having average molecular weights of about 2000 and 600 respectively, and Neodol® 23E which is an aliphatic monool from Shell.

Most preferred are polyester and polyether polyols having an average molecular weight of 200-6000 and an average nominal functionality of 2-4.

The solvent, which may be used in the epoxy resin composition according to the invention should have no isocyanate-reactive groups. Preferred solvents are organic solvents which are liquids at 25° C. Solvents having a viscosity at 25° C. of 3000 mPa·s or less as measured according to ASTM D445-11a are regarded as liquid solvents. Most preferred are organic, liquid solvents which are able to dissolve more than 1 mg of a certain compound comprising the carboxamide group per liter solvent at 25° C. Those skilled in the art can easily determine whether or not an organic liquid is suitable for use as solvent in the present invention, certainly with the above guidance. Examples of suitable solvents are esters (such as ethyl acetate, propyl acetate, propylene carbonate, phthalate esters), ketones (such as acetone, methyl ethyl ketone, methyl isobutyl ketone, cyclohexanone), aliphatic hydrocarbons (such as cyclohexane, heptane), chlorinated hydrocarbons (such as chloroform, dichloromethane), aromatic solvents (such as benzene, toluene), ethers (such as diethyl ether, dioxane, tetrahydrofuran) and mixtures thereof. Most preferably solvents are selected which have a low boiling point at ambient pressure or under vacuum (then they may be stripped off from the curable composition easily). They should preferably be able to dissolve at least 10 g of carboxamide per liter of solvent. The amount of solvent may vary between wide ranges. The lower limit is determined by the desired type and amount of compound comprising the carboxamide and its solubility in the selected solvent. The upper limit is determined by considerations of convenience and cost: the less the better.

The epoxy resin composition according to the present invention may be prepared by combining and mixing the epoxy resin and the compound comprising the carboxamide group, preferably at ambient pressure and a temperature between 10° C. and 120° C., normal mixing being preferred. Most preferably the temperature is between 15° C. and 40° C. Mixing may be conducted by normal stirring for 10 seconds to 5 hours and preferably for 30 seconds to 3 hours.

In order to make the epoxy resin composition according to the present invention using the optional monool and/or polyol, the above described carboxamide is combined and mixed with the above described monool and/or polyol preferably at ambient pressure and a temperature between 10° C. and 120° C. Although special mixing operations may be used, normal mixing is sufficient. The mixture so obtained optionally may be cooled if it was mixed at elevated temperature; subsequently it is mixed with the above described epoxy resin preferably at ambient pressure and a temperature between 10° C. and 80° C. The relative amounts of the epoxy resin, the polyol and the carboxamide are chosen in such a way that the aforementioned hydroxy/ epoxy and carboxamide/epoxy ratios are met. Mixing is conducted as indicated above.

In order to make the epoxy resin composition according to the present invention using the optional solvent, the same procedure is preferred as the one described above for using the optional monool and/or polyol. Of course the upper temperature applied is to be limited if the flammability of the solvent does not allow a higher temperature. Preferred temperatures are 15-40° C. Once the epoxy resin composition is made, the solvent may be stripped off by evaporation, distillation or any other suitable process known in the art. Mixing is conducted as indicated above.

The polyisocyanate used for making the polyisocyanate composition used according to the present invention may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and, in particular, methylene diphenyl diisocyanate (MDI) and polyisocyanate compositions comprising methylene diphenyl diisocyanate (like so-called polymeric MDI, crude MDI, uretonimine modified MDI and prepolymers having free isocyanate groups made from MDI and polyisocyanates comprising MDI) and mixtures of such polyisocyanates. MDI and polyisocyanate compositions comprising MDI are most preferred and especially those selected from 1) a diphenylmethane diisocyanate comprising at least 35%, preferably at least 60% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1) and/or 2), the variant having an NCO value of 20% by weight or more and being the reaction product of an excess of polyisocyanate 1) and/or 2) and of a polyol having an average nominal hydroxyl functionality of 2-4 and an average molecular weight of at most 1000; 4) a diphenylmethane diisocyanate comprising a homologue comprising 3 or more isocyanate groups; 5) prepolymers having an NCO value of 5-30% by weight and being the reaction product of any one or more of polyisocyanates 1)-4) and of a polyol having an average nominal hydroxyl functionality of 2-4 and an average molecular weight of more than 1000 and up to 8000; and 6) mixtures of any of the aforementioned polyisocyanates.

Polyisocyanate 1) comprises at least 35% by weight of 4,4'-MDI. Such polyisocyanates are known in the art and include pure 4,4'-MDI and isomeric mixtures of 4,4'-MDI, 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec® MPR and 1306 ex Huntsman (Suprasec is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec® 2020, ex Huntsman Urethane modified variants of the above polyisocyanate 1) are also known in the art, see e.g. The ICI Polyurethanes Book by G. Woods 1990, $2^{nd}$ edition, pages 32-35. Polyisocyanate 4) is also widely known and commercially available. These polyisocyanates are often called crude MDI or polymeric MDI. Examples are Suprasec® 2185, Suprasec® 5025 and Suprasec® DNR ex Huntsman.

The prepolymers (polyisocyanate 5)) are also widely known and commercially available. Examples are Suprasec® 2054 and Suprasec® 2061, both ex Huntsman.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec® 2021 ex Huntsman.

The lithium halide used in the polyisocyanate composition used according to the present invention is used in an amount of 0.0001-0.04 and preferably of 0.00015-0.025 and most preferably of 0.0005-0.02 moles per isocyanate equivalent and preferably is selected from lithium chloride and lithium bromide. Lithium chloride is most preferred.

The urea compound used in the polyisocyanate composition used according to the present invention is used in such an amount that the number of urea+biuret equivalents is 0.0001-0.4 and preferably 0.001-0.2 and most preferably 0.001-0.05 per isocyanate equivalent. Most preferably the number of urea+biuret equivalents in the urea compound in the polyisocyanate composition per mole of lithium halide ranges of from 0.5-60 and most preferably of from 0.5-30. The urea compound should not comprise other isocyanate-reactive groups (i.e. other than urea groups). In calculating the number of urea equivalents, the urea groups in the carboxamides are not taken into account.

The urea compound used in the polyisocyanate composition used according to the present invention has an average molecular weight of 500-15000 and preferably of 600-10000 and most preferably of 800-8000. Such urea compounds are prepared by reacting polyisocyanates and amines.

The polyisocyanates used to prepare such urea compound may be selected from the polyisocyanates mentioned above. The preferences mentioned above apply here as well. Most preferably polyisocyanates 1) and 2) and mixtures thereof are used. The polyisocyanate used to make the polyisocyanate composition according to the present invention and the polyisocyanate used to make the urea compound may be the same or different.

The amines used to prepare the urea compounds may be monoamines or polyamines. Preferably monoamines, optionally comprising a small amount of polyamines, are used. The average amine functionality of such mixtures preferably is at most 1.2. Most preferably only monoamines are used. Such amines preferably are primary amines.

The molecular weight of the amines is selected in such a way that once reacted with the selected polyisocyanate the molecular weight of the urea compound obtained falls within the above ranges. In general the molecular weight of the amines ranges of from 200-7500 and preferably of from 200-4500 and most preferably of from 200-3000.

The amines may be selected from those known in the art like amine-terminated hydrocarbons, polyesters, polyethers, polycaprolactones, polycarbonates, polyamides and mixtures thereof. Most preferred are amine-terminated polyoxyalkylene monoamines and more in particular polyoxyethylene polyoxypropylene monoamines. Preferably the oxypropylene content in these polyoxyalkylene monoamines is at least 50 and preferably at least 75% by weight calculated on the total weight of the monoamine molecule. Preferably the polyoxyalkylene monoamines have a monoalkyl group at the other end of the polymer chain, the alkyl group having 1-8 and preferably 1-4 carbon atoms. Such monoamines are known in the art. They are made by alkoxylating an alkylmonoalcohol having 1-8 carbon atoms and by subsequently converting the polyoxyalkylene monool into the monoamine. Such monoamines are commercially available. Examples are Jeffamine® M-600 and M-2005, both ex Huntsman (Jeffamine is a trademark of the Huntsman Corporation or an affiliate thereof which has been registered in one or more but not all countries). Mixtures of monoamines may be used as well.

In view of the above, a most preferred urea compound used in the polyisocyanate composition used according to the present invention is a urea compound obtained by reacting a methylene diphenyl diisocyanate or a polyisocyanate comprising a methylene diphenyl diisocyanate or a mixture of these polyisocyanates and a polyoxyalkylene monoamine, comprising oxypropylene groups in an amount of at least 75% by weight calculated on the total weight of the monoamine molecule and having an average molecular weight of 200-3000 and wherein the amine is a primary amine.

The polyisocyanate and the monoamine are combined and mixed and allowed to react. The reaction is exothermic and therefore does not require heating and/or catalysis, although heat and/or catalysis may be applied if this is regarded as convenient. For instance it may be convenient to pre-heat the polyisocyanate and/or the monoamine to 40-60° C. and to mix them then. After mixing, the temperature of the reacting mixture preferably is kept below 90° C. in order to avoid side reactions, like e.g. biuret formation. In order to ensure that all the amine reacts, a slight excess of polyisocyanate may be used; conducting the reaction at an index of 101-110 is preferred therefore. After at most 1 hour the reaction may be regarded as complete and the urea compound is ready for use to make the polyisocyanate composition used according to the present invention.

Since a small excess of polyisocyanate is used in preparing the urea compound and since the urea compound in a next step is added to a relatively large amount of polyisocyanate, some of the urea groups might be converted to biuret groups. By controlling the reaction temperature and the temperature of the subsequent mixing steps, such biuret formation is avoided as much as possible. In general, the number of urea groups which are converted into biuret groups is less than 25% and preferably less than 10%.

The polyisocyanate composition used according to the present invention is made by mixing the polyisocyanate, the urea compound and the lithium halide in any order under ambient conditions or at elevated temperature, e.g. at 40-70° C. Preferably the lithium halide is premixed with the urea compound and this mixture is subsequently added to the polyisocyanate and mixed. Before mixing the lithium halide and the urea compound, it may be convenient to dissolve the lithium halide in a solvent, like in an organic solvent like an alcohol, e.g. methanol or ethanol. The dissolved lithium halide is then added to the urea compound. Subsequently the solvent may be stripped off if desired. Premixing and mixing is conducted under ambient conditions or at elevated temperature, e.g. at 40-70° C. and is done by means of normal stiffing. The relative amounts of the polyisocyanate, the urea compound and the lithium halide are chosen in such a way that the final polyisocyanate composition used according to the invention has the relative amounts of isocyanate groups, urea groups and lithium halide as has been described before. Without wishing to be bound to any theory, the lithium halide is believed to be present in dissociated form, complexed with the urea group as a so-called bidentate complex.

The polyisocyanate composition is used to make a curable composition according to the invention by combining and mixing the epoxy resin composition and the polyisocyanate composition in such relative amounts that the number of epoxy equivalents per isocyanate equivalent ranges from 0.003-1 and preferably from 0.003-0.5 and most preferably from 0.005-0.25. These compositions are preferably combined and mixed under ambient conditions. The relative amounts of the ingredients are chosen in a way so as to provide an index of at least 300.

The curable composition so obtained has a good stability under ambient conditions. It is used to make a polyisocyanurate comprising material preferably having a Tg (measured according to ASTM D4065) of at least 120° C. by allowing it to react at elevated temperature, preferably above 50° C. and most preferably above 80° C. Therefore the invention is further concerned with a polyisocyanurate comprising material made by allowing a curable composition according to the present invention to react at elevated temperature and with a polyisocyanurate comprising material obtainable by allowing a curable composition according to the present invention to react at elevated temperature and with a process for making these polyisocyanurate comprising materials by allowing a curable composition according to the present invention to react at elevated temperature. Preferably the reaction is conducted at an index of at least 300. Preferably heat is applied in order to bring the curable composition to a temperature above 50° C. and most preferably above 80° C. Then the curable composition may cure fast (so-called snap-cure) while the temperature increases further (the reaction is exothermic).

The curable compositions according to the present invention may be used in a wide variety of composite processing methods to make a wide variety of composite materials. For example, they may be used to repair an object and in particular a pipe by applying them onto the interior and/or the exterior surface of such an object or such a pipe according to the so-called cured in place method. The curable compositions according to the present invention may be used in resin transfer moulding to produce door panels or honeycomb like structures, in vacuum assisted resin infusion to make structural automotive parts such as car bonnets or chassis rails, in filament winding to produce pressure vessels or gas tanks and in pultrusion to make glass fibre reinforced composite ladders or to produce prepregs used in printed circuit boards and in sheet and bulk moulding compounding processes. The polyisocyanurate comprising composite materials according to the present invention may further be used in sporting goods, in high volume production of automotive parts, in train parts, aerospace, marine applications, wind power devices, window lineals, structural parts, adhesives, packaging, encapsulants and insulators.

Before curing it, the curable composition may be fed into a mould in order to give it a certain shape or into a cavity of an object in order to provide the object with a polyisocyanurate comprising interior or onto a surface to provide such a surface with a polyisocyanurate comprising cover or it may be used to repair an object and in particular a pipe by applying it onto the interior and/or the exterior surface of such an object or such a pipe (examples of such pipe repair have been described in U.S. Pat. Nos. 4,009,063, 4,366,012 and 4,622,196) or it may be used to bind materials as has been disclosed in WO 2007/096216.

Before the curable composition is cured, additives may be added to it or to its constituents. Examples of additives are other catalysts, blowing agents, surfactants, water scavengers, like alkylorthoformate and in particular tri-isopropylorthoformate, antimicrobial agents, fire retardants, smoke suppressants, UV-stabilizers, colorants, plasticizers, internal mould release agents, rheology modifiers, wetting agents, dispersing agents and fillers.

If desired the polyisocyanurate comprising material according to the present invention may be subjected to post-curing.

The invention is illustrated with the following examples.

EXAMPLES

Chemicals Used:

Jeffamine® M-600: a monofunctional polyoxyethylene polyoxypropylene primary amine having a molecular weight of about 560 and an oxypropylene/oxyethylene ratio of about 9/1. Obtainable from Huntsman. In these examples referred to as M-600.

Suprasec® 1306 polyisocyanate ex Huntsman: 4,4'-MDI. In these examples referred to as S1306.

Suprasec® 2020 polyisocyanate: a uretonimine modified polyisocyanate ex Huntsman, in these examples indicated as S2020.

Suprasec® 2029 and 2054 are isocyanate terminated prepolymer compositions comprising MDI; both obtainable from Huntsman; in these examples indicated as S2029 and S2054.

Carbalink® HPC: hydroxypropyl carbamate, a carboxamide ex Huntsman.

DME® 500: dimethylether of polyoxyethylene glycol ex Clariant having a molecular weight of about 500

Araldite® DY-T epoxide ex Huntsman, triglycidylether of trimethylolpropane, indicated herein as DY-T. Araldite and Carbalink are trademarks of the Huntsman Corporation or an Affiliate thereof and has been registered in one or more but not all countries.

In none of the following examples biuret formation was observed.

Example 1

Preparation of Polyisocyanate Compositions Comprising Lithium Chloride and a Urea Compound.

A number of moles of an amine, which was kept at 50° C., and a number of moles of a polyisocyanate 1, which was also kept at 50° C., were mixed and allowed to react for 1 hour, while stirring, so as to form a urea compound. The reaction temperature was kept at 80° C. An amount of lithium chloride salt was dissolved in an amount of ethanol while stirring.

This solution was added to the above prepared urea compound which was still kept at 80° C. Stirring was continued for about 15 minutes. A substantial amount of ethanol was stripped off by distillation at 85-95° C. The amount of the urea/salt mixture so obtained is given in below Table 1; together with the amount and type of amine, polyisocyanate 1 and salt used and the amount of ethanol used.

An amount of the so prepared urea/salt mixture (having a temperature of about 60° C.) was added to an amount of a polyisocyanate 2 and mixed so as to prepare the polyisocyanate composition for use with an epoxy resin composition.

In below Table 2 the amounts and types of the ingredients used are given together with the ratio of the number of urea+biuret equivalents per isocyanate equivalent and the number of moles of salt per isocyanate equivalent and the number of urea+biuret equivalents per mole of salt. Parts by weight is indicated as pbw.

TABLE 1

| Urea compound | Amine type/ amount in moles | Polyisocyanate 1 type/ amount in moles | Salt type/ amount in grams | Ethanol/ amount in grams | Urea + salt mixture/ amount in grams |
|---|---|---|---|---|---|
| A | M-600/2 | S1306/1.04 | LiCl/23.9 | 125.3 | 1407.6 |

TABLE 2

| Polyisocyanate blends | Urea compound from table 1/ amount in pbw | polyisocyanate 2 type/amount in pbw | Urea + biuret/NCO ratio | Salt/NCO ratio | Urea + biuret/salt ratio |
|---|---|---|---|---|---|
| 1 | A/5 | S2020/95 | 0.0109 | 0.0030 | 3.65 |
| 2 | A/5 | S2029/95 | 0.0131 | 0.0036 | 3.65 |
| 3 | A/10 | S2020/95 | 0.0219 | 0.0060 | 3.65 |
| 4 | A/2.5 | S2020/95 | 0.0055 | 0.0015 | 3.65 |
| 5 | A/5 | S2054/95 | 0.0216 | 0.0060 | 3.65 |

Preparation of Epoxy Resin Compositions According to the Present Invention.

When solvent was used, the carboxamide was added to the solvent and mixed by stirring under ambient pressure and temperatures indicated in table 3. After cooling this mixture to ambient conditions, Araldite DY-T was added and stirred under ambient conditions. When no solvent was used, the carboxamide was added to the Araldite DY-T and stirred under ambient conditions. Stirring of the carboxamide and the Araldite DY-T, in the presence of solvent or not, was continued for about 2 minutes.

Preparation of Curable Compositions and Polyisocyanurate Comprising Materials According to the Present Invention.

The compositions of Table 2 were mixed with epoxy compositions according to the invention (and comparative ones) for 30 seconds and placed at room temperature in order to determine the pot-life by following the temperature profile with a thermocouple placed in the liquid resin till the onset of the temperature rise. The curable composition was allowed to react so as to prepare polyurethane polyisocyanurate comprising materials according to the present invention. The presence of isocyanurate groups was confirmed by Fourier Transformed InfraRed Spectroscopy (FTIRS).

The ingredients used, the amounts in parts by weight, the number of epoxy equivalents per isocyanate equivalent, the equivalent ratio of carboxamide per epoxy, the ratio of carboxamide equivalents per lithium chloride equivalents, and the pot-lives are given in Table 3. The ratio of OH groups/epoxy groups was in all examples 0.

In the first column, A1 means that urea compound A (Table 1) was used and Polyisocyanate blend 1 (Table 2), and A5 means that urea compound A was used and polyisocyanate blend 5.

TABLE 3

| Curable compositions | Compositions from table 2/ amount in pbw | Epoxy type/ amount in pbw | Solvent type/ amount in pbw | Carboxamide type/ amount in pbw | Mixing temperatures (° C.) | Epoxy/ NCO ratio | carboxamide/ epoxy ratio | carboxamide/ LiCl ratio | Pot-life (h) |
|---|---|---|---|---|---|---|---|---|---|
| A1* | 1/100 | DY-T/4 | n.u. | n.u. | n.a. | 0.048 | 0.000 | 0.00 | 6 |
| A1-2 | 1/100 | DY-T/4 | Propylene carbonate/5 | Propionamide/0.05 | 23 | 0.048 | 0.021 | 0.34 | 67 |
| A1-3 | 1/100 | DY-T/4 | Propylene carbonate/5 | Lactamide/0.05 | 40 | 0.048 | 0.018 | 0.28 | 54 |
| A1-4 | 1/100 | DY-T/4 | Acetone/5 | N-methyl urea/0.05 | 23 | 0.048 | 0.021 | 0.34 | 84 |
| A1-5 | 1/100 | DY-T/4 | Ethyl ether/5 | Propionamide/0.05 | 23 | 0.048 | 0.021 | 0.34 | 68 |
| A1-6 | 1/100 | DY-T/4 | Propylene carbonate/5 | 2-ethoxy benzamide/0.05 | 40 | 0.048 | 0.009 | 0.15 | 20 |
| A2-1 | 2/100 | DY-T/4 | Acetone/5 | Propionamide/0.05 | 23 | 0.058 | 0.021 | 0.34 | 63 |
| A2-2* | 2/100 | DY-T/4 | n.u. | n.u. | n.a. | 0.058 | 0.000 | 0.00 | 4 |
| A3-1 | 3/105 | DY-T/4 | Acetone/5 | Propionamide/0.05 | 23 | 0.048 | 0.021 | 0.17 | 30 |
| A1-7 | 1/100 | DY-T/8 | Acetone/5 | Propionamide/0.05 | 23 | 0.096 | 0.011 | 0.34 | 27 |
| A1-8 | 1/100 | DY-T/2 | Acetone/5 | Propionamide/0.05 | 23 | 0.024 | 0.043 | 0.34 | 145 |
| A4-1 | 4/97.5 | DY-T/4 | Acetone/5 | Propionamide/0.05 | 23 | 0.048 | 0.021 | 0.68 | 60 |
| A1-9 | 1/100 | DY-T/4 | Acetone/5 | Propionamide/0.025 | 23 | 0.048 | 0.011 | 0.17 | 37 |
| A1-10 | 1/100 | DY-T/4 | Acetone/5 | Propionamide/0.013 | 23 | 0.048 | 0.005 | 0.09 | 23 |
| A1-11 | 1/100 | DY-T/4 | Propylene carbonate/5 | Phenyl carbamate/0.05 | 40 | 0.048 | 0.011 | 0.18 | 30 |
| A1-12 | 1/100 | DY-T/4 | Ethyl ether/5 | Trichloro acetamide/0.05 | 23 | 0.048 | 0.009 | 0.15 | 70 |
| A1-13 | 1/100 | DY-T/4 | Propylene carbonate/5 | Phenyl carbamate/0.013 | 40 | 0.048 | 0.003 | 0.05 | 19 |
| A1-14 | 1/100 | DY-T/4 | Propylene carbonate/5 | Phenyl carbamate/0.025 | 40 | 0.048 | 0.006 | 0.09 | 51 |
| A1-15 | 1/100 | DY-T/4 | DME 500/5 | Propionamide/0.05 | 60 | 0.048 | 0.021 | 0.34 | 35 |
| A1-16 | 1/100 | DY-T/4 | DME 500/5 | Phenyl carbamate/0.05 | 60 | 0.048 | 0.011 | 0.18 | 31 |
| A1-17 | 1/100 | DY-T/4 | DME 500/5 | Urea/0.025 | 100 | 0.048 | 0.026 | 0.42 | 73 |
| A1-18 [1] | 1/100 | DY-T/4 | Acetone/5 | N-methyl urea/0.05 | 23 | 0.048 | 0.021 | 0.34 | 61 |
| A2-3 | 2/100 | DY-T/4 | n.u. | Propionamide/0.05 | 50 | 0.048 | 0.021 | 0.34 | 45 |
| A1-19 | 1/100 | DY-T/4 | DME 500/5 | Trichloro acetamide/0.05 | 23 | 0.048 | 0.009 | 0.15 | 53 |
| A5-1 | 5/100 | DY-T/4 | n.u. | Carbalink HPC/0.15 | 23 | 0.095 | 0.039 | 0.63 | 108 |
| A5-2 | 5/100 | DY-T/4 | n.u. | Carbalink HPC/0.075 | 23 | 0.095 | 0.020 | 0.32 | 22 | n.u. means not used
n.a. means not applicable
*Comparative example
[1] Acetone stripped off under vacuum before curing the resin Further Examples According to the Invention In Table 4 the information related to a few further experiments has been given, similar to Table 3 with the exception that the $T_g$ of the polyisocyanurate comprising material has been given instead of the pot-life of the curable composition. The $T_g$ was measured by Differential Mechanical Thermo Analysis on samples having a thickness of about 4 mm which had been cured in an open mould for 1 hour at 125° C. in an oven. With further post curing the $T_g$ could be higher.

The invention claimed is:
1. A curable composition, comprising a mixture of:
   (a) a polyisocyanate composition, comprising:
      (i) a first polyisocyanate,
      (ii) a lithium halide,
      (iii) a urea compound, wherein the urea compound is the reaction product of a second polyisocyanate and an amine, and wherein the urea compound has an average molecular weight of 500-15000 Daltons, and, optionally,
      containing biuret groups,

TABLE 4

| Curable compositions | Compositions from table 2/ amount in pbw | Epoxy type/ amount in pbw | Solvent type/ amount in pbw | Carboxamide type/ amount in pbw | Epoxy/ NCO ratio | carboxamide/ epoxy ratio | carboxamide/ LiCl ratio | Tg (tan δ) in ° C. |
|---|---|---|---|---|---|---|---|---|
| A1-20 | 1/100 | DY-T/4 | n.u. | Carbalink HPC/0.15 | 0.048 | 0.039 | 0.63 | 173.0 |
| A1-19 | 1/100 | DY-T/4 | DME 500/5 | Trichloro acetamide/0.05 | 0.048 | 0.009 | 0.15 | 191.5 |
| A1-21 | 1/100 | DY-T/4 | n.u. | Phenyl carbamate/0.05 | 0.048 | 0.011 | 0.18 | 203.1 |
| A1-3 | 1/100 | DY-T/4 | Propylene carbonate/5 | Lactamide/0.05 | 0.048 | 0.018 | 0.28 | 178.0 |
| A1-22 | 1/100 | DY-T/4 | Propylene carbonate/5 | N-Methyl urea/0.05 | 0.048 | 0.021 | 0.34 | 164.0 |
| A1-6 | 1/100 | DY-T/4 | Propylene carbonate/5 | 2-ethoxy benzamide/0.05 | 0.048 | 0.009 | 0.15 | 182.7 |
| A1-18 [1] | 1/100 | DY-T/4 | Acetone/5 | N-Methyl urea/0.05 | 0.048 | 0.021 | 0.34 | 168.0 | n.u. means not used
[1] Acetone stripped off under vacuum before curing the resin wherein the number of moles of lithium halide per isocyanate equivalent ranges from 0.0001-0.04 and the number of urea+biuret equivalents per isocyanate equivalent ranges from 0.0001-0.4, and wherein the first polyisocyanate and the second polyisocyanate may be the same or different; and (b) an epoxy resin composition comprising (i) an epoxy resin, and (ii) a compound comprising a carboxamide group having the structure —CO—NH$_2$, wherein the number of epoxy equivalents per isocyanate equivalent in the curable composition ranges from 0.003-1, wherein the number of carboxamide equivalents per epoxy equivalents is in a range from 0.0005 to 1; and wherein the number of carboxamide equivalents per lithium halide equivalents is in a range of from 0.054-0.7.

2. The composition according to claim 1, wherein the compound which comprises a carboxamide group has the structure NH$_2$—CO—R wherein R is 1) hydrogen (—H), 2) —NR$_1$R$_2$, 3) hydrocarbyl having 1-20 carbon atoms and optionally comprising hydroxyl, ether, halogen and/or amine groups, or 4) —R$_3$—CO—NH$_2$, wherein R$_1$ and R$_2$ independently from each other, are selected from hydrogen, hydroxy, halogen and hydrocarbyl groups which hydrocarbyl groups have 1-10 carbon atoms and optionally comprise hydroxy, ether, halogen and/or amine groups and wherein R$_3$ is a bivalent hydrocarbon radical having up to 8 carbon atoms and mixtures of such compounds.

3. The composition according to claim 1, wherein the compound which comprises a carboxamide group has the structure NH$_2$—CO—R wherein R is 1) —NR$_1$R$_2$, 2) alkyl having 1-10 carbon atoms and optionally comprising 1-3 hydroxy and/or ether groups, 3) phenyl or 4) tolyl, wherein R$_1$ and R$_2$, independently from each other, are selected from hydrogen, hydroxyl, phenyl, tolyl and alkyl having 1-6 carbon atoms and optionally comprising an hydroxyl and/or an ether group and mixtures of such compounds.

4. The composition according to claim 1, wherein the epoxy resin composition further comprises at least one of a monool and a polyol, and wherein the number of hydroxy equivalents per epoxy equivalent is at most 0.019.

5. The composition according to claim 1, wherein the urea compound does not comprise isocyanate-reactive groups other than urea groups, the number of urea+biuret equivalents per isocyanate equivalent is 0.001-0.2 and wherein the urea compound has been prepared by reacting a polyisocyanate selected from the group consisting of methylene diphenyl diisocyanate, a polyisocyanate comprising a methylene diphenyl diisocyanate, and a mixture of such with a polyoxyalkylene monoamine comprising oxypropylene groups in an amount of at least 50% by weight calculated on the total weight of the monoamine molecule, the urea compound having an average molecular weight of 200-3000 Daltons, and wherein the amine is a primary amine and wherein the number of urea+biuret equivalents per mole of lithium halide is 0.5-60.

6. The composition according to claim 1, wherein the polyisocyanate is selected from the group consisting of methylene diphenyl diisocyanate, a polyisocyanate composition comprising methylene diphenyl diisocyanate, and a mixture thereof.

7. The composition according to claim 1, wherein the amount of lithium halide is in a range from 0.00015-0.025 moles per isocyanate equivalent.

8. The composition according to claim 1, wherein the lithium halide is lithium chloride.

9. The composition according to claim 1, wherein the epoxy resin is liquid at 20° C.

10. A process for making a curable composition, comprising mixing:

a) a polyisocyanate composition, comprising:
(i) a first polyisocyanate,
(ii) a lithium halide,
(iii) a urea compound, wherein the urea compound is the reaction product of a second polyisocyanate and an amine, and wherein the urea compound has an average molecular weight of 500-15000 Daltons, and, optionally,
containing biuret groups, wherein the number of moles of lithium halide per isocyanate equivalent ranges from 0.0001-0.04 and the number of urea+biuret equivalents per isocyanate equivalent ranges from 0.0001-0.4, and b) an epoxy resin composition comprising (i) an epoxy resin, and (ii) a compound comprising a carboxamide group having the structure —CO—NH$_2$, wherein the amount of epoxy resin composition is used in an amount such that the number of epoxy equivalents per isocyanate equivalent ranges from 0.003-1 wherein the number of carboxamide equivalents per epoxy equivalents is in a range from 0.0005 to 1; and wherein the number of carboxamide equivalents per lithium halide equivalents is in a range of from 0.054-0.7.

11. The process according to claim 10, further comprising reacting the curable composition at a temperature greater than 50° C. to produce a composition at least partially comprising a polyisocyanurate.

12. The curable composition according to claim 4, wherein the number of hydroxy equivalents per epoxy equivalent is at most 0.014.

13. The curable composition according to claim 4, wherein the number of hydroxy equivalents per epoxy equivalent is at most 0.010.

14. The curable composition according to claim 1, wherein the epoxy resin composition further comprises a solvent which has no isocyanate-reactive groups.

15. The curable composition according to claim 1, wherein the compound which comprises a carboxamide group has the structure NH$_2$—CO—R, wherein R is —NR$_1$R$_2$, wherein R$_1$ and R$_2$, independently from each other, are selected from hydrogen, hydroxy, halogen and hydrocarbyl groups having 1-10 carbon atoms and, optionally, comprise at least one of hydroxy, ether, halogen, and amine groups.

16. The curable composition according to claim 1, wherein the compound which comprises a carboxamide group is selected from the group consisting of hydroxyurea, nicotinamide, hydroxypropyl carbamate, lactamide, and combinations thereof.

17. The process according to claim 11, wherein the curable composition is reacted at a temperature greater than 80° C. to produce a composition at least partially comprising a polyisocyanurate.

18. The composition according to claim 1, wherein the number of carboxamide equivalents per epoxy equivalents is in a range of from 0.0005 to 0.03.

19. The process according to claim 10, wherein the number of carboxamide equivalents per epoxy equivalents is in a range of from 0.0005 to 0.03.

* * * * *